United States Patent [19]

Honda et al.

[11] 4,090,546
[45] May 23, 1978

[54] PUNCTURE-SEALING PNEUMATIC TIRE AND A METHOD OF PRODUCING THE TIRE

[75] Inventors: Toshio Honda, Akigawa; Shoji Tanaka, Higashi-Yamato; Koichi Iwami, Kunitachi; Yukio Fukuura, Kodaira; Itsuo Tanuma, Tokorozawa; Yoshikatsu Suzuki, Higashi-Murayama; Hiromi Akiyoshi, Kodaira, all of Japan

[73] Assignee: Bridgestone Tire Company Limited, Tokyo, Japan

[21] Appl. No.: 753,167

[22] Filed: Dec. 21, 1976

[30] Foreign Application Priority Data

Dec. 29, 1975   Japan .................................. 50-157734

[51] Int. Cl.² ............................................. B60C 21/08
[52] U.S. Cl. ...................... 152/347; 106/33; 156/115
[58] Field of Search ...................... 152/346, 347, 348; 156/115; 106/33

[56] References Cited

U.S. PATENT DOCUMENTS

| | | | |
|---|---|---|---|
| 2,752,979 | 7/1956 | Knill et al. | 152/347 |
| 2,756,801 | 7/1956 | Iknayan et al. | 152/347 |
| 2,827,098 | 3/1958 | Semegan et al. | 152/347 |
| 3,361,698 | 1/1968 | Pace | 152/347 |
| 3,628,585 | 12/1971 | Pace | 152/347 |
| 3,952,787 | 4/1976 | Okado et al. | 152/347 |

Primary Examiner—Drayton E. Hoffman
Assistant Examiner—Carl Rowold
Attorney, Agent, or Firm—Sughrue, Rothwell, Mion, Zinn and Macpeak

[57] ABSTRACT

A viscous rubber composition consisting mainly of a non-polar rubber, polybutene and white carbon has high adhesion and excellent puncture-sealing properties. Pneumatic tires provided with a puncture-sealing layer formed of such a viscous rubber composition have a high resistance against the puncture due to foreign substances penetrated through the tire.

11 Claims, 1 Drawing Figure

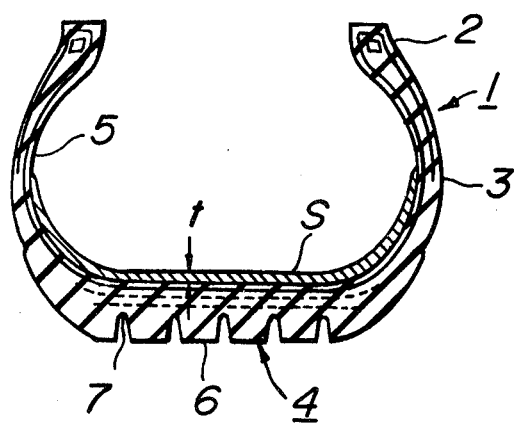

PUNCTURE-SEALING PNEUMATIC TIRE AND A METHOD OF PRODUCING THE TIRE

BACKGROUND OF THE INVENTION

The present invention relates to a puncture-sealing pneumatic tire provided with a layer which prevents the leakage of air when foreign substances, such as nails and the like, on the road are penetrate through the tread of the tire during running, and to a method for producing such a tire.

In order to avoid tire puncture deflation there has been proposed a pneumatic tire provided with a puncture-sealing layer formed of a thin viscous rubber layer adhered integrally to the inner peripheral surface of the tire at the backside of the tread portion. This pneumatic tire is generally produced in the following manner. A thin rubber sheet, which is not hardened and elasticized even by heating and which has a width sufficient to cover the tread portion of a tire, is used as a puncture-sealing layer, and is firstly wound up on a cylindrical green tire-former at a position corresponding to a tread portion of the tire, and then other members for constituting the tire are successively superposed thereon to produce the green tire. This method is advantageous in that even when a green tire produced thereby is made hard and elastic by vulcanization, the puncture sealing rubber layer is formed at a given position of the inner peripheral surface of the tire with a certain constant thickness while maintaining its viscosity. Therefore, even when foreign substances penetrate through the tread of the tire during running, the viscous rubber layer surrounds the foreign substances and the air in the tire does not leak. Moreover, even when the foreign substances fall out from the tread due to centrifugal force caused by the rotation of the tire, the viscous rubber flows into the holes left and tightly closes them and as the result the tire remains air-tight. However, in this method, pneumatic tires having a desired high puncture-sealing ability have not yet been obtained.

The reason is as follows. When a viscous rubber layer having the ability to catch and retain nails by adhesion is used, it moves towards and accumulates in the center portion of the tread due to the lowering of its viscosity and centrifugal force, which are caused by heat accumulation in the tire and the temperature rise of the tire during running. As the result, the viscous rubber is localized to lower the desired performance of the tire and cause unbalance in rotation, and the tire cannot be often driven safely. In order to prevent the moving and accumulation of the viscous rubber, a cover layer and a honeycomb-shaped layer for preventing the movement of viscous rubber must be arranged in the puncture-sealing layer. However, the movement of viscous rubber cannot be completely prevented. On the contrary, when a hard viscous rubber layer having poor flowability is used, the adhesion of the rubber layer to foreign substances, is poor.

Further, it is indispensable for the puncture-sealing layer that it maintains a predetermined performance throughout high temperature and low temperature, that the layer is not oxidized and deteriorated by air at high temperature and under high pressure, and that the layer does not deteriorate the other materials constituting the tire.

SUMMARY OF THE INVENTION

The inventors have found that when a puncture-sealing layer is formed by using a specifically limited viscous rubber composition consisting mainly of a non-polar rubber, polybutene and white carbon, a novel tire which is usable in a safe manner is obtained.

A feature of the present invention is the provision of a puncture-sealing pneumatic tire provided on its inner peripheral surface with a puncture-sealing layer formed of a viscous rubber composition consisting mainly of (A) 100 parts by weight of a mixture of 5-35 parts by weight of at least one non-polar rubber selected from the group consisting of ethylene-propylene copolymer elastomer, ethylene-propylene-diene terpolymer elastomer, polyisobutylene elastomer and isobutylene-isoprene copolymer elastomer, and 95-65 parts by weight of polybutene, and (B) 5-35 parts by weight of white carbon, said puncture-sealing layer having a viscosity of $1.6 \times 10^4 - 2.0 \times 10^6$ poises at room temperature and under a shear rate of 100 sec$^{-1}$, and said white carbon being dispersed in said puncture-sealing layer in the form of particles having a size of not larger than 50 $\mu$m.

Another feature of the present invention is the provision of a method of producing a puncture-sealing pneumatic tire, which comprises diluting with a solvent a viscous rubber composition as described above, coating the resulting liquid rubber composition on the inner peripheral surface of a vulcanized tire, and volatilizing the solvent to form a puncture-sealing layer composed of the viscous rubber composition on the inner peripheral surface of the tire.

The mixing ratio of polybutene to the non-polar rubber has an influence upon the viscosity of the resulting puncture-sealing layer. When the mixing ratio of polybutene to the non-polar rubber is smaller than 65/35, the viscosity of the resulting viscous rubber composition is too high, and the rubber composition loses its puncture-sealing properties. When the mixing ratio is larger than 95/5, the flowability of the composition is too high and the composition affects adversely the performances of the tire.

White carbon is added to the mixture of the non-polar rubber and polybutene in order to enhance the strength (nerve) of the puncture-sealing layer. When the amount of white carbon is less than 5 parts by weight based on 100 parts by weight of the mixture of the non-polar rubber and polybutene, a puncture-sealing layer having the necessary strength cannot be obtained. When the amount of white carbon exceeds 35 parts by weight, the resulting puncture-sealing layer is brittle, the expected performance cannot be obtained.

The puncture-sealing layer is formed in the following manner. Given amounts of a non-polar rubber, polybutene and white carbon are kneaded together at a temperature of 30°-150° C, preferably 60°-80° C, for 2-15 minutes, preferably 3-10 minutes. The resulting rubber composition may be rolled into a sheet having a desired thickness, for example, about 1.5-3 mm, and the sheet may be superposed at a position corresponding to a tread together with other members for constituting a tire in the production step of a green tire, or may be stuck to the inner peripheral surface of a green tire. However, when the above obtained rubber composition is diluted with a solvent, and the resulting liquid rubber composition is coated on the inner peripheral surface of a vulcanized rubber by the air spray system or airless spray system with the use of a sprayer, by a brush or by a doctor coating system, the rubber composition can be easily stuck to the inner peripheral surface of a vulcanized tire. Particularly, according to the air spray system, air is incorporated into the coating liquid to form a spongy coated layer at the initial stage of the coating, and further the solvent is rapidly evaporated, and the coating liquid does not flow nor drip. Therefore, the air spray system is preferably used as a means for the coating. Particularly, when white carbon is kneaded together with the non-polar rubber and polybutene in the above described amounts to prepare a rubber composition, and the rubber composition is diluted with a solvent, the resulting liquid rubber composition is very strong during coating, and dropping of the liquid rubber composition is very small. That is, the coating operation can be carried out very easily. Therefore, the use of air spray system in the coating of the liquid rubber composition can adhere a uniform puncture-sealing layer to the inner peripheral surface of a tire in a simple manner.

When the rubber composition consisting of the non-polar rubber, polybutene and white carbon and, if necessary other fillers, is diluted with a solvent, the concentration of the rubber composition in the resulting liquid rubber composition is preferred to be 0.1-55% by weight.

The liquid rubber composition obtained by diluting with a solvent the rubber composition to be used in the present invention is excellent in flowability and has a long shelf life, and when the liquid rubber composition is coated on the inner peripheral surface of a tire, a viscous puncture-sealing layer, which does not substantially flow under various temperature conditions, can be obtained.

The non-polar rubber to be used in the present invention is as follows. The ethylene-propylene copolymer elastomer (hereinafter abbreviated as EPR) is a copolymer obtained by copolymerizing ethylene and propylene in a proper copolymerization ratio so that the copolymer has an elastic property. The ethylene-propylene-diene terpolymer elastomer (hereinafter abbreviated as EPDM) is a terpolymer of ethylene, propylene and a diene, the amount of the diene being specifically limited so that the terpolymer has a desired iodine value. The diene used as the third component includes dicyclopentadiene, 5-ethylidene-2-norbornene, 5-methylene-2-norbornene, 1,4-hexadiene, 2-alkylnorbonadiene, cyclooctadiene and the like. EPDM having a Mooney viscosity of 35-110 at 100° C and an iodine value of 2-30 is commercially available. The isobutylene-isoprene copolymer elastomer (hereinafter abbreviated as IIR) is a copolymer if isobutylene and isoprene. IIR having an unsaturation degree of 0.5-2.5 mol% due to isoprene and a Mooney viscosity of 30-60 at 100° C is commercially available and can be advantageously used in the present invention. Polyisobutylene elastomer is an elastic homopolymer of isobutylene.

The polybutene to be used in the present invention is a random copolymer of isobutylene and normal butylene, which are $C_4$ fractions of petroleum. Polybutene having a viscosity of 20-33,000 centistokes (cst) is commercially available and can be advantageously used in the present invention.

The white carbon to be used in the present invention is a silica series white filler and includes artificially produced fine powdery silica and silicates. These silica and silicates are produced by a dry proces, wherein silica-containing compounds, such as silicon halogenide, siliceous stone, siliceous sand and terra abla, or organosilicon compounds are thermally decomposed or by a wet process, wherein sodium silicate or silicon halogenide is decomposed by acid, ammonium salt or alkali salt, or is ion-exchanged by ion-exchange resin; and the like. It has been found that the white carbon produced in these methods is advantageously used in the present invention.

In the present invention, the above described viscous rubber composition adheres to the inner surface of a tire and to foreign substances such as nails due to the synergistic effect of the non-polar rubber, polybutene and white carbon, and fills up and seals holes after the foreign substances have come out, and further does not flow and accumulate in the center portion of the tread crown the inner surface of a tire during high speed running, whereby tires which are more safe for practical use can be obtained.

That is, the viscous rubber composition of the present invention has a relatively high viscosity and is hardly influenced by heat, and therefore the rubber composition is free from flowing and accumulation during running, even when a cover layer or a flow preventing wall is not used. Moreover, the viscous rubber composition adheres tightly to foreign substances penetrated through a tire due to its high adhesion, and even when a hole formed through a tire by the penetration of a foreign substance is enlarged during the running of the tire and the foreign substance comes out through the enlarged hole, the foreign substance pulls the viscous rubber composition, which is tightly adhered to the foreign substance, into the hole and fills the hole to keep the tire completely air-tight.

In the present invention, the non-polar rubber is used in an amount of 5-35 parts by weight (hereinafter, "parts" mean by weight), preferably 10-30 parts, more preferably 15-25 parts.

Polybutene is used in an amount of 65-95 parts, preferably 70-90 parts, more preferably 70-85 parts.

White carbon is used in an amount of 5-35 parts, preferably 10-30 parts, more preferably 12.5-22.5 parts, based on 100 parts of the mixture of the non-polar rubber and polybutene.

As described above, the adhesion of the viscous rubber composition to foreign substances depends mainly upon the amount of polybutene, and polybutene must be used in an amount of not less than a certain amount based on the amount of the non-polar rubber, but when the amount of the adhesive component (polybutene) increases, the flowability of the mixture of the non-polar rubber and polybutene is increased, and the mixture cannot be used satisfactorily in the present invention. While white carbon is remarkably higher in the effect for increasing viscosity than carbon black, calcium carbonate and magnesium carbonate, and the flowability of the viscous rubber composition, which contains a large amount of polybutene in the above described mixing ratio, can be lowered most effectively by adding a relatively small amount of white carbon to the mixture of non-polar rubber and polybutene. As the result, a puncture-sealing layer having both of the contradictory properties of high viscosity and low flowability can be formed.

One of the necessary properties required for the rubber composition of the present invention is viscosity. The flowability of the viscous rubber composition varies depending upon the kind of white carbon, the kneading method, the mixing degree and the amounts of the mixed components. In the present invention, any kinds of white carbon may be used and any kneading methods, any mixing degrees and any mixing ratios of the components may be adopted, but the viscosity of the resulting puncture-sealing layer formed of the viscous rubber composition must be at least $1.6 \times 10^4$ poises.

It has been found from the result of experiments relating to the puncture-sealing properties of tires according to the present invention, which have been carried out under various load and speed conditions on the road, on a test course and on an indoor steel drum, that when the puncture-sealing viscous rubber layer (i.e., the viscous rubber composition) has a very limited viscosity of $1.6 \times 10^4 14$ $2.0 \times 10^6$ poises, preferably $3.5 \times 10^4 - 1.2 \times 10^5$ poises, more preferably $4.5 \times 10^4 - 1.0 \times 10^5$ poises, at room temperature and under a shear rate of $100 \text{ sec}^{-1}$, the puncture-sealing layer does not flow under all of the running conditions of a tire and satisfies all of the necessary properties required for the layer. The viscosity of the composition can be easily calculated from the relation between the pressure and the flow rate when the rubber composition flows in a cylinder having a certain inner diameter. In the present invention, the Koka type flow tester is generally used.

Another necessary property of the viscous rubber composition of the present invention relates to the particle size of white carbon dispersed in the composition. It has been found from various experiments that, unless the particle size is not larger than a certain limit, a puncture-sealing layer having a satisfactorily high puncture-sealing property cannot be obtained. The particle size of dispersed white carbon can be measured by various methods, but the sedimentation method is most suitable for the viscous rubber composition of the present invention. It is necessary in the present invention that, when the viscous rubber composition is diluted with n-hexane to form a liquid containing the white carbon in a concentration of 10% by weight, and the particle size of the white carbon is measured at a temperature of 30° C and calculated according to the Stokes' formula, the particle size of dispersed white carbon is not larger than 50 μm, preferably not larger than 30 μm, more preferably not larger than 20 μm.

Stokes' formula is as follows:

$$\frac{dx}{dt} = \frac{1}{18} \frac{(\rho_2 - \rho_1)}{\eta} d^2$$

In the formula,
$d$: particle size, $x$: settled distance,
$\rho_2$: density of precipitated particle,
$\rho_1$: density of continuous phase (transparent liquid),
$\eta$: viscosity of continuous phase, and
$g$: gravitational acceleration.

The fact that the particle size of dispersed white carbon must be limited to not larger than 50 μm means that white carbon and the non-polar rubber must be kneaded under a large shearing force. When white carbon is merely stirred in a solution of a non-polar rubber, the white carbon cannot be dispersed in the solution in a particle size of not larger than 50 μm.

It has been a viscous rubber composition containing white carbon uniformly dispersed therein and having a particle size of not larger than 50 μm has a very excellent puncture-sealing property.

In the present invention, non-polar rubbers of EPR, EPDM, polyisoprene elastomer and IIR may be used in admixture in any mixing ratios, and further can be used together with polymers, such as polyethylene, ethylene-vinyl acetate copolymer, ethylene-acrylate copolymer and the like, in an amount that the polymer is compatible with the non-polar rubber. Fillers, such as carbon black, calcium carbonate, clay, titanium white, zinc white and the like, and various pigments as a coloring agent may be used as an auxiliary additive.

As the solvent to be used for lowering the viscosity of the viscous rubber composition composed of non-polar rubber, polybutene and white carbon, any solvents, which can dissolve EPR, EPDM, polyisobutylene copolymer elastomer, IIR and polybutene, can be used. The solvents include aromatic hydrocarbons, such as benzene, toluene, xylene, etc.; aliphatic hydrocarbons, such as pentane, hexane, heptane, etc.; halogenated hydrocarbons, such as chloroform, dichloromethane, carbon tetrachloride, etc.; linear or cyclic ethers, such as diethyl ether, tetrahydrofuran, dioxane, etc.; ketones, such as acetone, methyl ethyl ketone, methyl isobutyl ketone, etc.; and gasoline, which is a low boiling point component of petroleum; and the like. Among these solvents, toluene, xylene and gasoline are preferably used alone or in admixture.

When the viscous rubber composition of the present invention, after being diluted with the solvent, is adhered to the inner peripheral surface of a tire, an ideal puncture-sealing layer, which does not substantially flow under various use conditions of the tire, is formed.

BRIEF DESCRIPTION OF THE DRAWING

For a better understanding of the invention, reference is taken to the accompanying drawing, wherein:

The single FIGURE is a cross-sectional view of a pneumatic tire provided on its inner peripheral surface with the puncture-sealing layer of the present invention.

DETAILED DESCRIPTION OF THE PREFERRED EMBODIMENTS

In the FIGURE, the numerals 1, 2, 3 and 4 represent a tire, a bead portion, a side wall and a tread portion, respectively. A puncture-sealing layer S having a thickness of $t$ is adhered to the inner peripheral surface of a tire 1, said layer extending from the middle portion of one of the side walls 3 to the middle portion of the other side wall 3 along the back side of the tread portion 4.

In adhering the puncture-sealing layer S, the following three liquid rubber compositions A, B and C were used.

Liquid rubber composition A, which will be hereinafter abbreviated as liquid A, was prepared as follows. 240 g of EP 84X (trademark of EPDM made by Japan Synthetic Rubber Co., iodine value 12), 750 g of Polybutene 300R (trademark of polybutene made by Idemitsu Petroleum and Chemical Co., number average molecular weight 1,330, viscosity at 98.9° C 850 cst) and 210 g of Nipsil VN-3 (trademark of white carbon made by Nippon Silica Co.) were thoroughly kneaded by a Brabender, and the resulting viscous rubber composition was diluted with 1,800 g of n-hexane to prepare the liquid rubber composition A. The viscosity of the viscous rubber composition before the dilution, measured by a Koka type flow tester, was $8.2 \times 10^4$ poises at room temperature and under a shear rate of $100 \text{ sec}^{-1}$. The particle size of the white carbon dispersed in the viscous rubber composition, which was measured by the above described method, was 12 μm.

Liquid rubber composition B, which will be hereinafter abbreviated as liquid B, was prepared as follows. 290 g of Butyl 218 (trademark of IIR made by Japan Synthetic Rubber Co., unsaturation degree 1.5 mol%) and 700 g of Polybutene 300R were kneaded together with 210 g of Nipsil VN-3, and the resulting viscous rubbr composition was diluted with 1,800 g of n-hexane to prepare the liquid rubber composition B. The viscous rubber composition before the dilution, had a viscosity of $6.1 \times 10^4$ poises under the same measuring condition as that in the liquid A. The particle size of the dispersed white carbon was 15 μm.

Liquid rubber composition C, which will be hereinafter abbreviated as liquid C, was prepared as follows. 240 g of JSREP 11 (trademark of EPR made by Japan Synthetic Rubber Co., volatile mater 0.5% by weight, specific gravity 0.86, Mooney viscosity 40) was kneaded together with 750 g of Polybutene 300R and 210 g of Nipsil VN-3, and the resulting viscous rubber composition was diluted with 1,800 g of n-hexane to prepare the liquid rubber composition C. The viscous rubber composition before the dilution, had a viscosity of $5.3 \times 10^4$ poises under the same measuring condition as that in the liquid A. The particle size of the dispersed white carbon was 16 μm.

The above obtained liquid rubber composition A was charged into a tank, and the internal pressure of the tank was raised to 3 kg/cm². The tank was connected to a sprayer, and the liquid A was spray-coated to the inner peripheral surface of a tire of 195/70 HR14 size from the middle portion of one of side walls 3 to the middle portion of the other side wall 3 along the back side of a tread portion 4 by means of the sprayer. In this spraying, the liquid A was uniformly coated along the peripheral direction of the tire so that a puncture-sealing layer was formed having a thickness of about 1.5 mm, particularly at the back side of the tread portion 4.

The liquid rubber compositions B and C also were coated on the inner peripheral surface of tires having the above described size in the same manner as described above.

All of the liquid rubber compositions were directly coated on the inner peripheral surface of the tire without wiping off oily releasing agents or stains, such as talc and the like. Within 5 hours after the coating of the liquids A, B and C, the solvent liquid was evaporated and the were hardened. After hardening, the hardened liquids A, B and C were tightly adhered to the inner peripheral surface of the tire. When the viscosities of the hardened liquids A, B and C were measured under the same condition as that described in the measurement of viscosities of the viscous rubber compositions before diluting, the viscosities of the hardened liquids A, B and C were same as those of the viscous rubber compositions.

The following experiments were carried out with respect to the above obtained 3 kinds of puncture-sealing tires.

(1) Flowability of puncture-sealing layer during high speed running of the tire.

Each of the above obtained tires was mounted on a rim and inflated to an internal pressure of 2.2 kg/cm². The tires were run on a metallic drum of 1 m diameter having a smooth surface at a speed of 140 km/hr for 3 hours under a load of 430 kg. After the above test, all of the puncture-sealing layers did not flow and maintained the original state before the running. Moreover, when a maximum temperature at the coated portion was examined by means of a temperature indicating label, it was found after the running that the highest temperature of the tire coated with the liquid A was about 75° C, that of the tire coated with the liquid B was about 80° C, and that of the tire coated with the liquid C was about 75° C. These temperatures are substantially the same as the highest temperature, to which a tire is raised when running on a highway in midsummer. Therefore, the test result shows that tires provided with the puncture-sealing layer are substantially free from the softening of the layer due to high temperature and from the flow of the layer due to centrifugal force caused by high speed rotation, which occur often in tires of this kind.

(2) Property for sealing internal pressure against nail holes.

Each of the tires used in the above experiment was again mounted on a rim and inflated to an internal pressure of 2.2 kg/cm² at room temperature. Twenty-four nails were driven into the periphery of each tire such that two of each of nails having lengths of 30 mm, 45 mm and 60 mm were driven into a block 6 and a groove bottom 7, both located at the central portion of the tread portion 4 at one end thereof. After a certain period of time was elapsed, the nails were pulled out, and the nail holes were examined for air leakage. As the result, air did not leak through any nail holes in the three kinds of tires, and the sealing property of the tires was complete.

Further, when the same experiment was effected at a low temperature of −20° C with respect to the above described three kinds of tires, the viscosity of the puncture-sealing layer did not increase so high that the puncture-sealing property was damaged and the property for sealing internal pressure remained intact in all of the tires.

(3) Property for sealing internal pressure of a tire with nails driven thereinto during running over a long distance.

Twenty-four nails were driven into the periphery of each of the above described three kinds of tires such that two of each of nails having lengths of 30 mm, 45 mm and 60 mm were driven into a block 6 and a groove bottom 7, both located at the center of a tread portion 4 at one end thereof. The tires were then continuously run on a metallic drum 1 m diameter having a smooth surface at a constant speed of 80 km/hr over a distance of 8,600 km under a load of 430 kg.

When a tire runs, the temperature of the tire rises and the internal pressure thereof increases. Therefore, after the tires with the nails were run over a certain distance to raise the temperature to a steady value the internal pressure of each tire was adjusted to 2.2 kg/cm² and the above experiment was effected. After the tires were run over the above described distance, the internal pressure of each tire was checked. As the result, it was ascertained that the internal pressures were the same as the adjusted pressure, and air did not leak through the nail holes.

When the liquid rubber composition is coated on the inner peripheral surface of a tire to form a puncture-sealing layer, a brush or a spatula can be used in place of the above described sprayer. Furthermore, a puncture-sealing layer can be formed by coating the liquid rubber composition on the inner peripheral surface of a tire up to a certain thickness, drying the coated layer and further coating the liquid rubber composition on the dried coated layer; or by sticking a sponge sheet, which is composed of a proper material and has a proper width, and which has previously been impregnated with the liquid rubber composition, to a predetermined position on the back side of a tread portion. Moreover, the puncture-sealing layer itself is not air permeable. Therefore, when the liquid rubber composition is coated all over the inner peripheral surface extending between both of the bead portions of a tubeless tire to form a puncture-sealing layer, it functions as an inner liner to give the tubeless tire resistance against leakage of internal pressure.

What is claimed is:

1. A puncture-sealing pneumatic tire provided on its inner peripheral surface with a puncture-sealing layer formed of a viscous rubber composition consisting mainly of
   (A) 100 parts by weight of a mixture of 5–35 parts by weight of at least one non-polar rubber selected from the group consisting of ethylene-propylene copolymer elastomer, ethylene-diene terpolymer elastomer, polyisobutylene elastomer and isobutylene-isoprene copolymer elastomer, and 95–65 parts by weight of polybutene, and
   (B) 5–35 parts by weight of white carbon,
said puncture-sealing layer having a viscosity of $1.6 \times 10^4 - 2.0 \times 10^6$ poises at room temperature and under a shear rate of 100 $sec^{-1}$, and said white carbon being dispersed in said puncture-sealing layer in the form of particles having a size of not larger than 50 μm.

2. The tire according to claim 1, wherein the amount of white carbon is 10–30 parts by weight based on 100 parts by weight of the mixture of the non-polar rubber and polybutene.

3. The tire according to claim 2, wherein said puncture-sealing layer formed of the viscous rubber composition has a viscosity of $3.5 \times 10^4 - 1.2 \times 10^5$ poises at room temperature and under a shear rate of 100 $sec^{-1}$, and the particle size of dispersed white carbon is not larger than 30 μm.

4. The tire according to claim 1, wherein the mixture of the non-polar rubber and polybutene consists of 10–30 parts by weight of the non-polar rubber and 90–70 parts by weight of polybutene.

5. The tire according to claim 1, wherein said puncture-sealing layer formed of the viscous rubber composition has a thickness of about 1.5–3.0 mm.

6. The tire according to claim 1, wherein said non-polar rubber is ethylene-propylene copolymer elastomer.

7. The tire according to claim 1, wherein said non-polar rubber is ethylene-propylene-diene terpolymer elastomer.

8. The tire according to claim 1, wherein said non-polar rubber is isobutylene-isoprene copolymer elastomer.

9. A method of producing a puncture-sealing pneumatic tire, which comprises diluting a viscous rubber composition consisting mainly of
   (A) 100 parts by weight of a mixture of 5–35 parts by weight of at least one non-polar rubber selected from the group consisting of ethylene-propylene copolymer elastomer, ethylene-propylene-diene terpolymer elastomer, polyisobutylene elastomer and isobutylene-isoprene copolymer elastomer, and 95–65 parts by weight of polybutene, and
   (B) 5–35 parts by weight of white carbon, with a volatile solvent selected from the group consisting of aromatic hydrocarbons, aliphatic hydrocarbons, halogenated hydrocarbons, ketones, linear or cyclic ethers and gasoline and of a quantity sufficient to make the concentration of the rubber composition consisting of the non-polar rubber, polybutene and white carbon in the resulting liquid rubber composition 0.1 to 55% by weight,
said viscous rubber composition having a viscosity of $1.6 \times 10^4 - 2.0 \times 10^6$ poises at room temperature and under a shear rate of 100 $sec^{-1}$; coating the resulting liquid rubber composition on the inner peripheral surface of a vulcanized tire; and volatilizing the solvent to form a puncture-sealing layer composed of the viscous rubber composition on the inner peripheral surface of the tire.

10. The method according to claim 9, wherein said volatile solvent is a member selected from the group consisting of benzene, toluene, xylene, pentane, hexane, heptane, chloroform, dichloromethane, carbon tetrachloride, diethyl ether, tetrahydrofuran, dioxane, acetone, methyl ethyl ketone, methyl isobutyl ketone and gasoline.

11. The method according to claim 9, wherein said liquid rubber composition is coated by means of a sprayer.

* * * * *